United States Patent

Haga et al.

[11] Patent Number: 6,125,707
[45] Date of Patent: Oct. 3, 2000

[54] PRESSURE DETECTION DEVICE

[75] Inventors: Kyosuke Haga, Anjo; Jiro Nakano; Satoshi Suto, both of Okazaki; Tomonari Yamakawa, Aichi-ken; Katsunori Yamada, Aichi; Mitsuru Asai, Aichi; Nobuo Kamiya, Aichi, all of Japan

[73] Assignee: Toyoda Koki Kabushiki Kaisha, Kariya, Japan

[21] Appl. No.: 09/181,081

[22] Filed: Oct. 27, 1998

[30] Foreign Application Priority Data

Oct. 28, 1997 [JP] Japan ................................. 9-295471
Jun. 24, 1998 [JP] Japan ................................ 10-193679

[51] Int. Cl.$^7$ ........................................................ G01L 9/00
[52] U.S. Cl. ......................................................... 73/745
[58] Field of Search ............................. 73/744, 745, 756, 73/706; 338/36, 43, 47; 200/83 J, 83 N, 83 R, 83 S

[56] References Cited

U.S. PATENT DOCUMENTS

| 4,326,171 | 4/1982 | Shaw et al. . |
| 5,353,003 | 10/1994 | Maurer . |
| 5,872,345 | 2/1999 | Takahashi et al. . |

FOREIGN PATENT DOCUMENTS 0 777 247    6/1997   European Pat. Off. .
40 09 377   10/1991   Germany .

OTHER PUBLICATIONS

Patent Abstracts of Japan, vol. 009, No. 006 (P–326), Jan. 11, 1985, JP 59 155734, Sep. 4, 1984.

*Primary Examiner*—William Oen
*Attorney, Agent, or Firm*—Oblon, Spivak, McClelland, Maier & Neustadt, P.C.

[57] ABSTRACT

A pressure detection device for detecting an increase of pressure acting thereon includes an electrically conductive device housing which has an accommodation bore extending inward from one end of the device housing and a slide bare extending between the accommodation bore and the other end of the device housing. A piston is slidably disposed within the slide bore and adopted to receive a pressure, and a terminal serving as one electric contact is fixed to the accommodation bore via an electrical insulator. A disk spring serving as the other electric contact deforms due to a pressing force of the piston and coming in contact with the terminal. The pressure detection device further comprises an electro-functional member attached to either the terminal or the disk spring in which the electro-functional member is changeable its electric resistance due to an impressed pressing force acting thereon. Further, at least one of a notch and a chamfer is provided on the electro-functional member for changing its electric resistance characteristic.

11 Claims, 9 Drawing Sheets

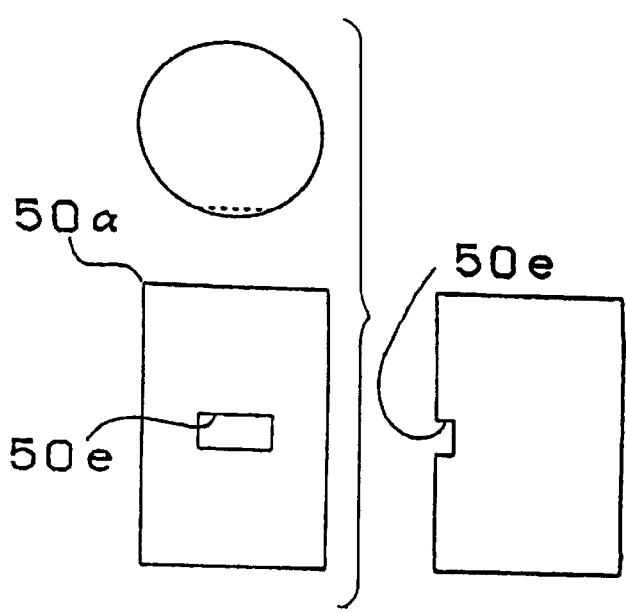
FIG. 9(E)
FIG. 9(EI)
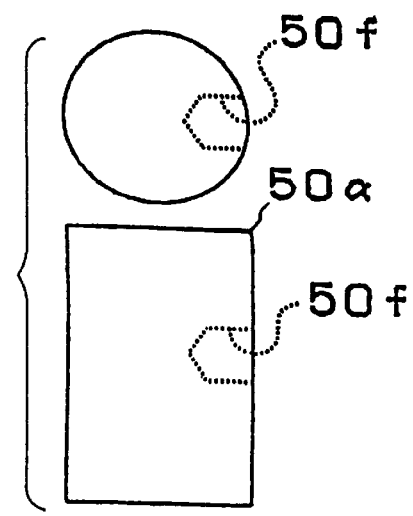
FIG. 9(F)
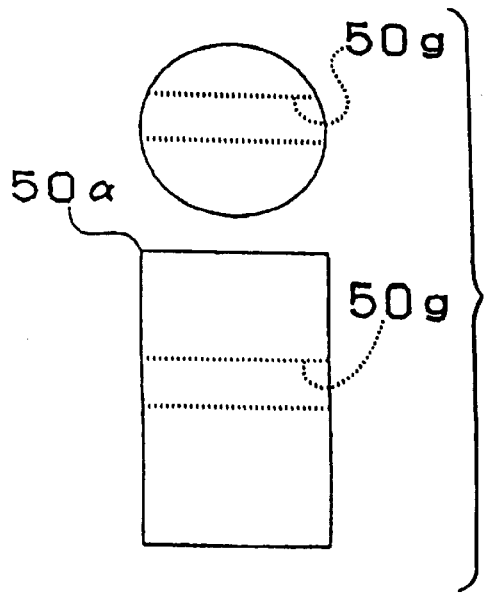
FIG. 9(G)
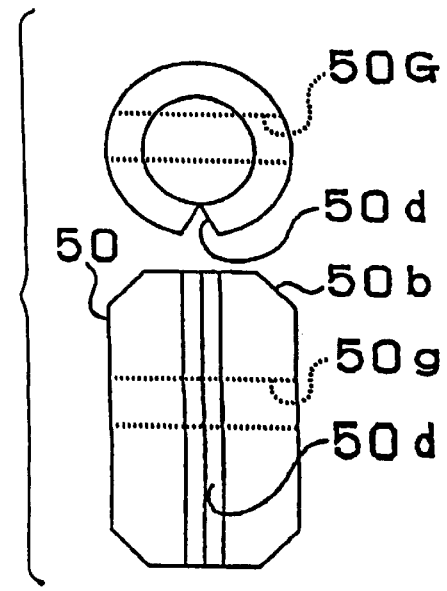
FIG. 9(H)

PRESSURE DETECTION DEVICE

BACKGROUND OF THE INVENTION

1. Field of the Invention

The present invention relates to a pressure detection device used for detecting a pressure increase in a hydraulic apparatus, more particularly, to a pressure detection device in which a functional material changing an electric resistance corresponding to a load pressure operated thereto is provided between two electrodes thereof.

2. Description of the Related Art

In a hydraulic power steering apparatus used in an automobile or the like, a hydraulic pump is generally driven by an engine of the automobile, and operation fluid discharged from the hydraulic pump is supplied to the power steering apparatus, so as to assist the driver's steering operation.

In such a hydraulic power steering apparatus, when a steering operation is carried out while the automobile is stopped, i.e., the engine is running at its idle rotational speed (hereinafter referred to as "stationary steering operation"), the load pressure in the hydraulic pump increases, whereby the engine may be stalled.

In order to solve this problem, the conventional automobile employs a so-called idle-up mechanism in which a pressure switch is provided for detecting an increase in the load pressure of the hydraulic pump so as to operate the idle-up mechanism while the engine is running at the idle rotational speed.

FIG. 1 shows an example of such a pressure switch, as disclosed in Japanese Patent Laid Open Publication No. 9-147708. In FIG. 1, numeral 1 denotes a switch housing, which is attached to a pressure introduction passage 3 formed in a pump housing. In the switch housing 1, a piston 4 is disposed so as to be axially movable according to an increase of the load pressure led from the pressure introduction passage 3. In an upper portion of the piston 4, a terminal 5 is arranged to be defined as one of a pair of electrode contacts, which is supported by a support ring 7 via a resin 6 serving as an electric insulator.

Between the terminal 5 and the piston 4, a disc spring 8 is provided to be defined as the other electrode contact, which comes into contact with the terminal 5 when being deformed by the pressure force of the piston 4. The disc spring 8 is supported by the support ring 7 and the switch housing 1, and is grounded by electrically communicating from the switch housing 1 to the pump housing 2.

In the pressure switch as configured above, when the load pressure in the hydraulic pump is raised due to the stationary steering operation while the engine is running at the idle rotational speed, the pressure increase acts onto the piston 4, whereby the piston 4 is slid against the spring force of the disc spring 8. With this slide movement of the piston 4, the disc spring 8 is deformed and then is electrically brought into contact with the terminal 5, so that the pump housing 1 is electrically communicated with the terminal 5, whereby the pressure switch generates an electric signal for the idle-up operation to a control apparatus.

However, the conventional pressure switch has such a function that operates in an ON-OFF manner where it is turned on when the load pressure of the hydraulic pump exceeds a predetermined pressure. Therefore, it is impossible to continuously control the engine so as to change the rotational speed thereof according to the load pressure of the hydraulic pump. In the automobile providing such a pressure switch, the engine is controlled so as to increase the idle rotational speed in correspondence with a maximum load of the hydraulic pump when the ON-operation of the pressure switch is carried out, so that the energy consumption of the automobile is increased.

In the hydraulic power steering apparatus, it may be thought to use a pressure sensor to continuously change the idle rotational speed of the engine according to the load pressure of the hydraulic pump. However, the pressure sensor has a complex construction and is expensive compared with the pressure switch as described above. Further, an element consisting of the pressure sensor has a low characteristic in linearity, so that it requires an electric circuit for compensating the output thereof, whereby it is more expensive. This is a reason why the pressure sensor is not used generally.

SUMMARY OF THE INVENTION

Accordingly, an object of the present invention is to solve the above-described problem and to provide a pressure detection device in which an electric-functional member is provided for detecting a load pressure of a hydraulic pump with simple construction and low cost.

Another object of the present invention is to provide a pressure detection device which is capable of changing its electric resistance characteristic by changing a shape of an electro-functional member.

Further object of the present invention is to provide a pressure detection device which is capable of compensating the output signal thereof with an ambient temperature detection element.

Briefly, a pressure detection device according to the present invention includes an electrically conductive device housing which has an accommodation bore extending inward from one end of the device housing and a slide bore extending between the accommodation bore and the other end of the device housing. A piston is slidably disposed within the slide bore and adopted to receive a pressure, and a terminal serving as one electric contact is fixed to the accommodation bore via an electrical insulator. A disk spring serving as the other electric contact deforms due to a pressing force of the piston and coming in contact with the terminal. The pressure detection device further comprises an electro-functional member attached to either the terminal or the disk spring in which the electro-functional member is changeable its electric resistance due to an impressed pressing force acting thereon.

With this construction, the output signal of the electro-functional member changes corresponding to the load pressure acting thereon, so that the pressure detection device can detect the load pressure.

Further, a notch and/or a chamfer is provided on the electro-functional member for changing its electric resistance characteristic. Therefore, it is possible to change the electric resistance characteristic of the pressure detection device without adding another electric circuit or device.

Furthermore, a thermistor is provided in the pressure detection device for detecting an ambient temperature thereof, so that it is possible to compensate the output signal of the electro-functional member based upon the ambient temperature, whereby the construction of the pressure detection device can be simplified and the assemble cost thereof can be diminished.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

Figure 10:
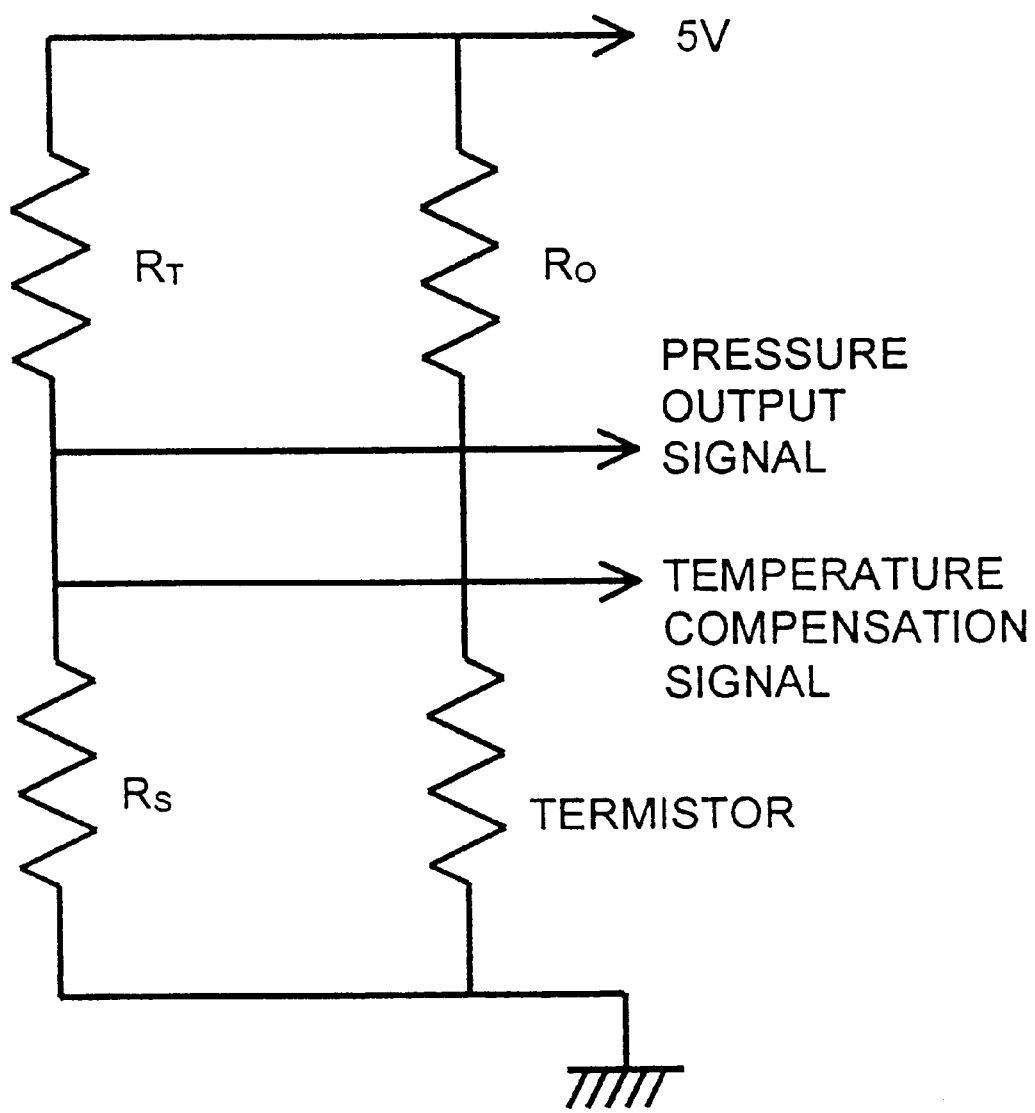

FIGS. 9(A)–9(H) are top and front views showing various contact members according to the third embodiment of the present invention; and FIG. 10 is a circuit diagram for compensating a detected signal from the contact member based upon an ambient temperature thereof, according to the third embodiment of the present invention.

DETAILED DESCRIPTION OF THE PREFERRED EMBODIMENTS

The present invention will be described hereinafter with reference to the accompanying drawings.

Figure 1:
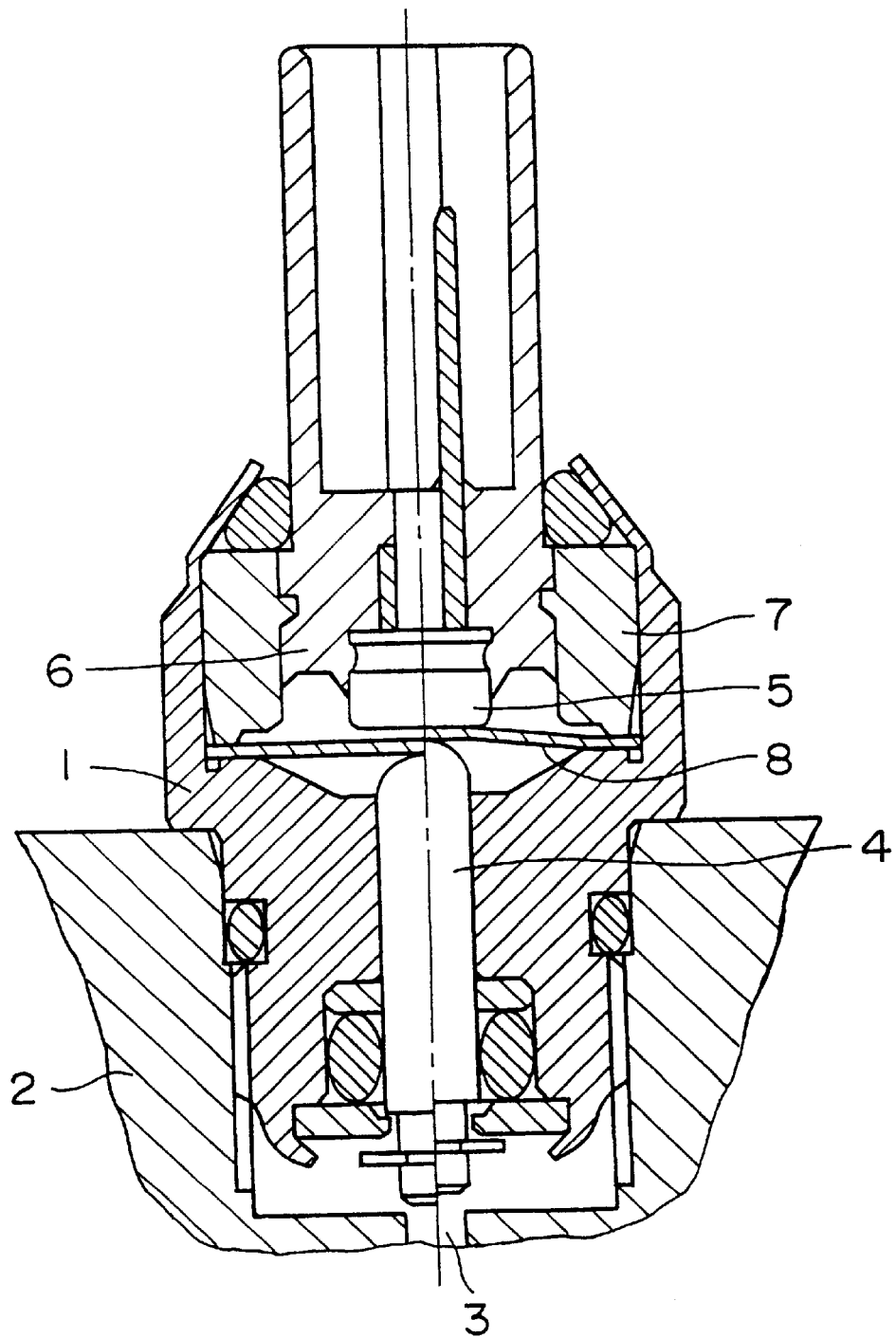
FIG. 1 is a sectional view showing a conventional pressure switch.
Figure 2:
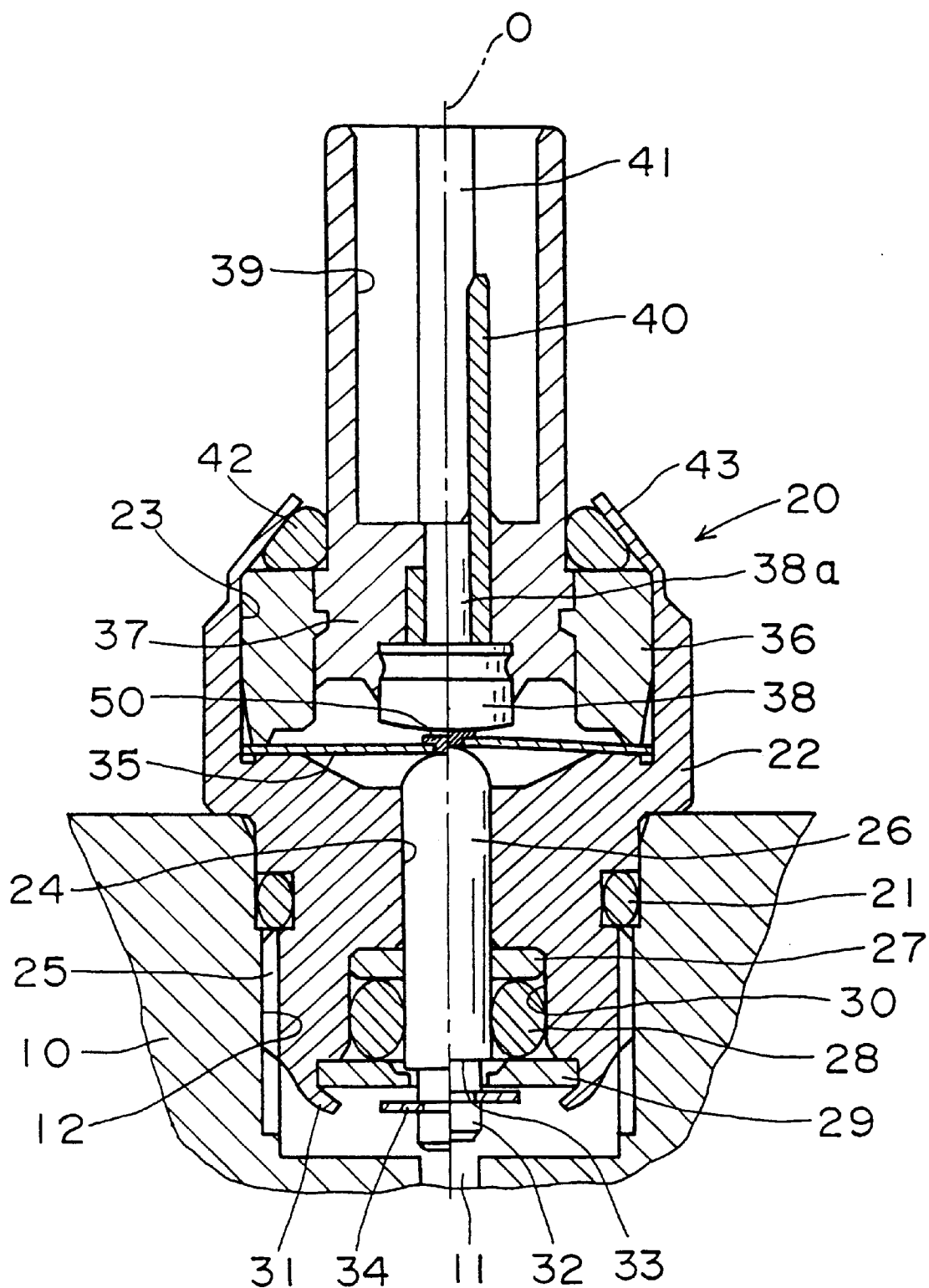
FIG. 2 is a sectional view showing a pressure detection device according to a first embodiment of the present invention.

A first embodiment of the present invention will be described hereinafter with reference to FIGS. 2–4. FIG. 2 shows a sectional view of a pressure detection device according to the first embodiment of the present invention. In FIG. 2, the left side of a center axis O depicts a state in which no load pressure acts on the pressure detection device, while the right side of the center axis O depicts a state in which a certain load pressure acts on the pressure detection device.

In FIG. 2, numeral 10 denotes a pump housing of a hydraulic pump in which a pressure introduction passage 11 is formed. A pressure detection device 20 according to the first embodiment of the present invention is screwed into a threaded hole 12 formed at the opening end of the pressure introduction passage 11, with a seal ring 21 being interposed between the threaded hole 12 and the pump housing 10 so as to secure in a fluid-tight manner.

A housing 22 of the pressure detection device 20 has an accommodation bore 23 that has a large diameter and extend inward from one end of the housing 22, as well as a slide bore 24 that has a smaller diameter and extends between the accommodation bore 23 and the other end of the housing 22. On the outer circumferential surface of the other end of the housing 22 is formed a threaded portion 25 for screw engagement with the threaded hole 12 of the pump housing 10.

A piston 26 is slidably inserted into the slide bore 24 such that the tip end of the piston 26 projects into the accommodation bore 23, which shape takes in the form of a half-spherical surface. A depression 30 is formed at the opening end (lower end in FIG. 2) of the slide bore 24 so as to accommodate therein a Teflon ring 27, an O-ring 28 and an engagement member 29, in this order with respect to the direction toward the pressure introduction passage 11. The outer circumferential surface of the piston 26 is in close contact with the inner circumferential surface of the O-ring 28. A thin-wall portion 31 of the lower end of the housing 22, which end corresponds to the depression 30, is deformed inward through caulking or crimping, so that the Teflon ring 27, the O-ring 28 and the engagement member 29 are prevented from moving axially.

The piston 26 has a smaller diameter portion 32 at its one end which faces the pressure introduction passage 11. Movement of the piston 26 toward the pressure introduction passage 11 is limited by engagement between the engagement member 29 and a stepped portion 33 formed at the root of the smaller diameter portion 32. Moreover, a stopper ring 34 is attached to the outer circumferential of the smaller diameter portion 32. Engagement of between the stopper ring 34 and the engagement member 29 prevents the piston 26 from excessively moving toward the accommodation bore 23 even when an abnormal pressure acts on the piston 26.

Figure 3:
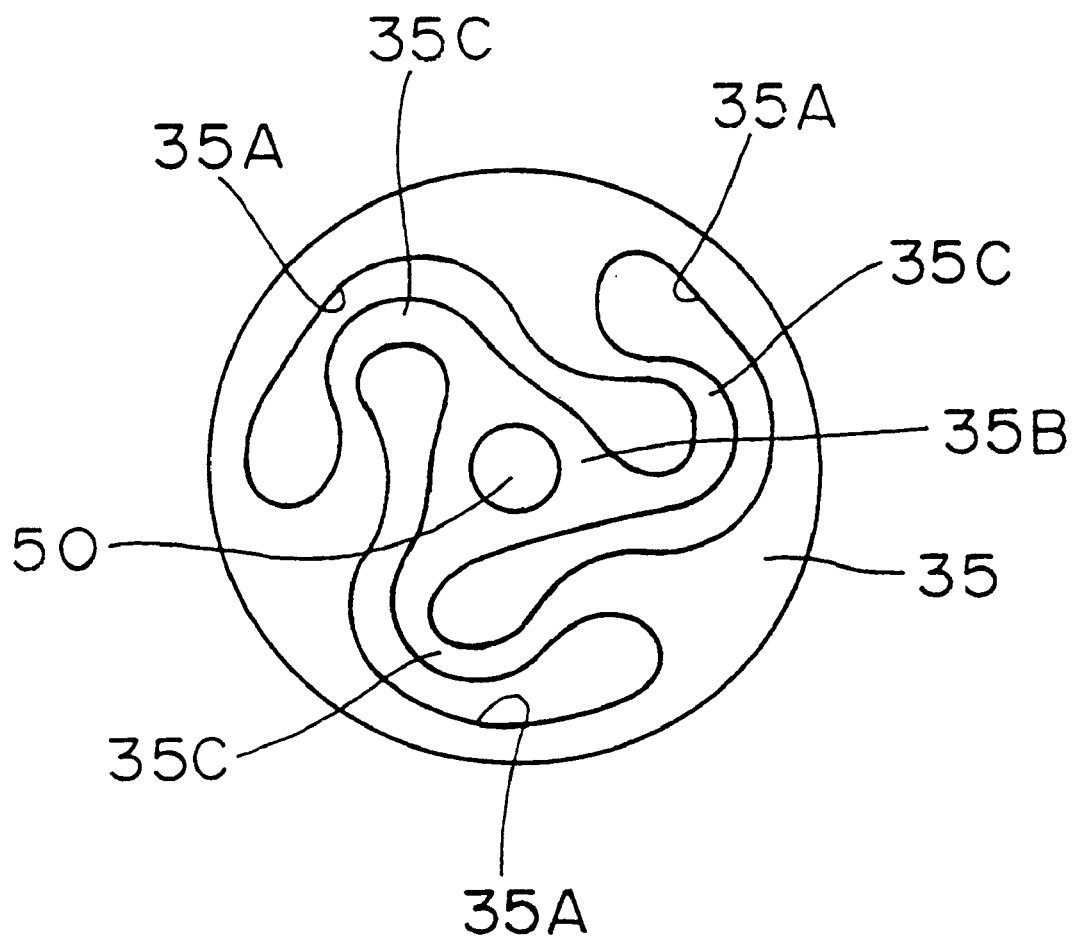
FIG. 3 is a top plan view showing a disk spring of the first embodiment.

At the bottom of the accommodation bore 23 is disposed a disk spring 35 having a shape shown in FIG. 3. The disk spring 35 is held at its outer circumferential edge by a holding ring 36, which is press-fit into the accommodation bore 36. The disk spring 35 is formed of metallic thin plate and has three cut portions 35A which extend from the outer edge toward the center of the disk spring 35, so that there is formed a center portion 35B which is supported by flexible portions 35C formed by the cut portions 35A. When a force greater than a predetermined level is applied onto the center portion 35B, the flexible portions 35C deform, and the center portion 35B moves accordingly. As described above, the disk spring 35 is grounded to the vehicle body via the housing 22 and the pump housing 10.

As shown in FIGS. 2 and 3, on the center portion 35B is joined a contact member 50 made of an electro-functional material having an electric resistance characteristics which changes its electric resistance corresponding to a mechanical strain applied thereon. This electro-functional material has such a characteristic that its electric resistance is large in a case that no mechanical strain acts thereon, while its electric resistance becomes to be smaller gradually in accordance with the mechanical strain acting on the electro-functional material, wherein the strain is gradually larger.

It is preferred to that described in Japanese Patent Laid Open Publication No. 10-30908 as the electro-functional material. The sensing member (i.e., electro-functional material) as disclosed in Japanese Patent Laid Open Publication is secured as the contact member 50 onto the center portion 35B of the disk spring 35.

Further, in the disk spring 35, the flexible portions 35C are deformed when pressure applied to the center portion 35B excesses the predetermined level, so that the disk spring 35 is brought into contact with the terminal 38 via the contact member 50, whereby the terminal 38 is grounded to the pump housing 10 through the housing 22 of the pressure detection device 20.

Before the holding ring 36 is press-fit into the housing 22, the terminal 38 is placed within and attached to the holding ring 36 via a support 37 made of resin serving as an insulating material. The support 37 extends upward in FIG.

2 so as to form an attachment bore 39 into which an unillustrated connector is inserted. As described above, since an end portion of the terminal 38 takes in the form of half-spherical surface, a contact area of the terminal 38 with the contact member 50 is gradually increased from its initial state as pressure acting on the piston 26 becomes to be large. A connection terminal 40 is connected to a shaft portion 38a of the terminal 38 and projects into the attachment bore 39 for engagement with the unillustrated connector. In FIG. 2, numeral 41 denotes a guide groove for guiding the connector within the attachment bore 39 when the connector is inserted into the attachment bore 39. Further, an unillustrated power supply is connected to the connection terminal 40 so as to detect an electric resistance between the pair of electrodes (i.e., the disk spring 35 and the terminal 38).

Numeral 42 denotes an O-ring made of rubber and having a circular cross section. The O-ring 42 is placed within the opening portion of the accommodation bore 23 such that it sits on the upper end surface of the holding ring 36 and is in close contact with the outer circumference of the support 37. A thin wall end portion 43 of the housing 22, which surrounds the accommodation bore 23, is deformed inward through caulking so as to elastically deform the O-ring 42, so that the opening portion of the accommodation bore 43 is sealed. Also, through caulking, the holding ring 36 is fixed to the housing 22 via the O-ring 42, so that the disk spring 35 is held in place.

Figure 4:
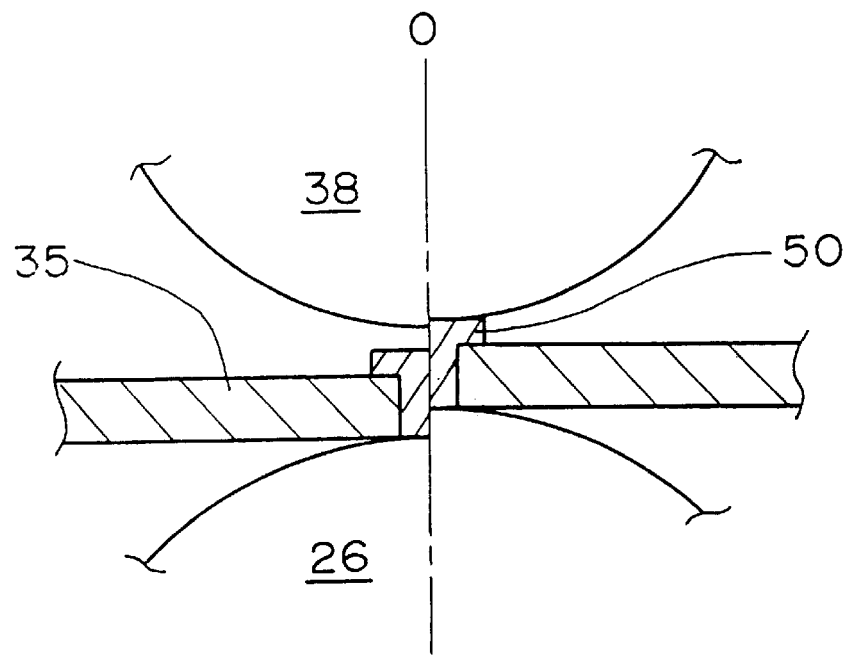
FIG. 4 is an enlarged sectional view of FIG. 2.

With reference to FIGS. 2 and 4, the left side of the center axis O depicts a state in which no load pressure from the pressure introduction passage 11 acts on the piston 26, while the right side of the center axis O depicts a state in which a certain load pressure acts thereon. In the case that the holding ring 36 to which the terminal 38 is attached is assembled within the housing 22, the end portion of the terminal 38 faces with the contact member 50 provided on the center portion 35B of the disk spring 35 via a slight clearance. In such a case, the end portion of the terminal 38 is brought into contact with the contact member 50 due to a slight elastic deformation of the flexible portions 35C.

Next, the operation of the pressure detection device as constructed above will be now explained.

The left side of the center axis O shown in FIG. 4 depicts a state of the terminal 38, the disk spring 35 and the contact member 50 in which the steering wheel is not operated. In such a state, the load pressure is not raised, so that the flexible portions 35C of the disk spring 35 is not deformed, whereby the clearance between the end portion of the terminal 38 and the contact member 50 is maintained. Therefore, the terminal 38 is not electrically communicated with the disk spring 35.

However, in the case that the steering wheel is operated (i.e., stationary steering operation) in which the engine is running at the idle rotational speed, the load pressure of the hydraulic pump increases due to this operation, and acts on the lower end of the piston 26 through the pressure introduction passage 11, resulting in coming the piston 26 into contact with the disk spring 35. Further, the load pressure increases over the spring force of the disk spring 35, so that the flexible portions 35C are deformed by the pressing force of the piston 26, whereby the contact member 50 contacts with the terminal 38. As a result of contact, the terminal 38 is electrically communicated with the disk spring 35. The right side of the center axis O in FIG. 4 shows a state of the terminal 38, the disk spring 35 and the contact member 50 in the stationary steering operation.

As mentioned above, the contact member 50 consists of a electro-functional material (ceramics) having an electric resistance characteristic that changes its resistance according to the mechanical strain applied thereon, so that the electric resistance between the terminal 38 and the disk spring 35 changes in correspondence with the load pressure of the hydraulic pump. Detecting the electric resistance between the terminal 38 and the disk spring 35, the detected value of the electric resistance is output to an engine control apparatus (not shown). Therefore, it is possible to control the engine so as to continuously change its idle rotational speed in accordance with the load pressure of the hydraulic pump.

Figure 5:
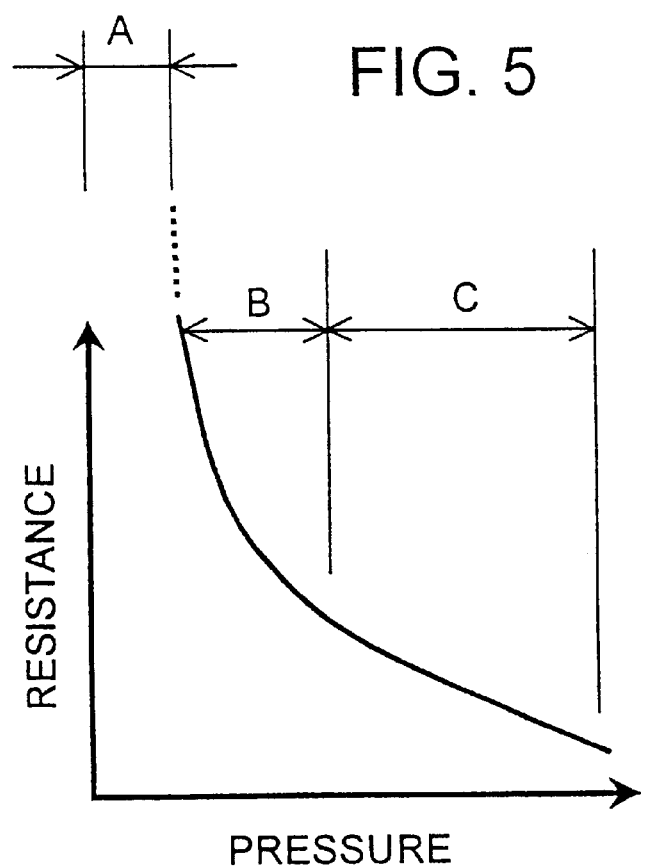
FIG. 5 is a graph showing a relationship between an electric resistance of a contact member and a load pressure acting thereon according to the first embodiment of the present invention.

FIG. 5 is a graph showing a relationship between the detected electric resistance and the load pressure of the hydraulic pump in the pressure detection device 20 according to the fist embodiment.

In case that no load pressure acts on the piston 26, i.e., the steering wheel is not operated while the engine is running at the idle rotational speed, the contact member 50 is not in a contact with the terminal 38, so that the electric resistance between the terminal 38 and the contact member 50 is infinite, as shown by an area A of the FIG. 5. Accordingly, in a condition that the steering wheel is not operated, a leakage current is zero, so that the electric power consumption can be eliminated.

Where the steering operation is small relatively, i.e., the load pressure of the hydraulic pump is low, the contact member 50 comes into contact with the terminal 38 initially. In such a state, the electric resistance is large and however, it becomes to be smaller due to the increase of the mechanical strain in the contact member 50 and of contact area between the terminal 38 and the contact member 50 as the load pressure of the hydraulic pump increases. Therefore, sensitive area can be obtained, as shown the area B in FIG. 5.

Further, in the case of the stationary steering operation (i.e., the load pressure of the hydraulic pump changes form middle to large), the deformation of the contact member 50 is saturated, as shown by the right side of the center axis O in FIG. 4. Therefore, the area C proportional to the load pressure can be obtained due to the mechanical strain of the contact member 50.

According to the first embodiment of the present invention, it is possible to control the idle rotational speed of the engine corresponding to the load pressure of the hydraulic pump. Further, the energy consumption can be eliminated in non-steering operation with a simple construction and low cost.

Next, a second embodiment according to the present invention will be now described with reference to FIGS. 6 and 7.

Figure 6:
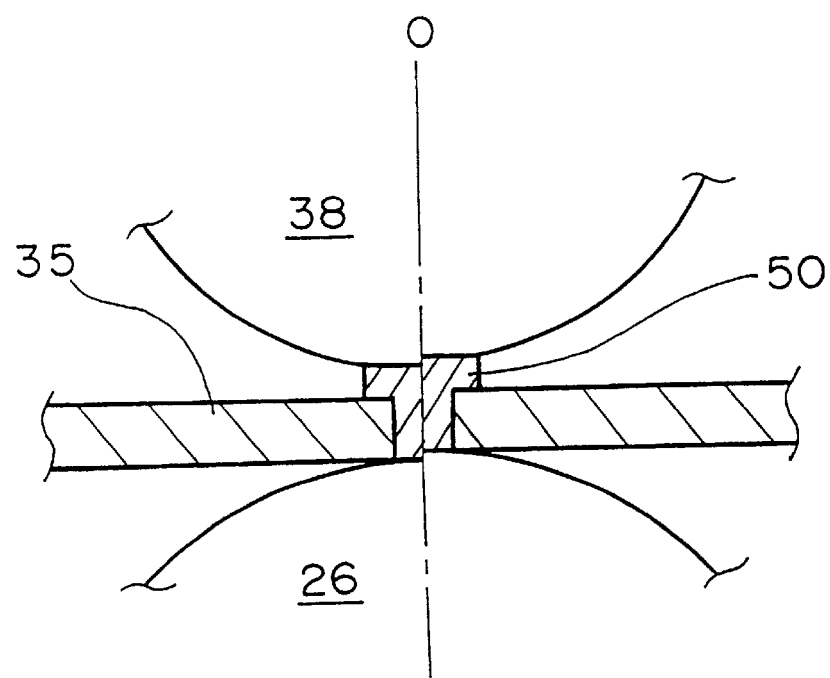
FIG. 6 is an enlarged sectional view according to a second embodiment of the present invention.

In the second embodiment as shown by a left side of the center axis O in FIG. 6, the contact member 50 is in a slight contact with the terminal 38 in no load pressure, i.e., the steering wheel is not operated. The second embodiment is different form the first embodiment in that the pair of electrodes (the contact member 50 and the terminal 38) are contacted with a slight contact area. Similarly to the first embodiment, a right side of the center axis O in FIG. 6 depicts a state in which the load pressure acts on the contact member 50 through the piston 26.

Figure 7:
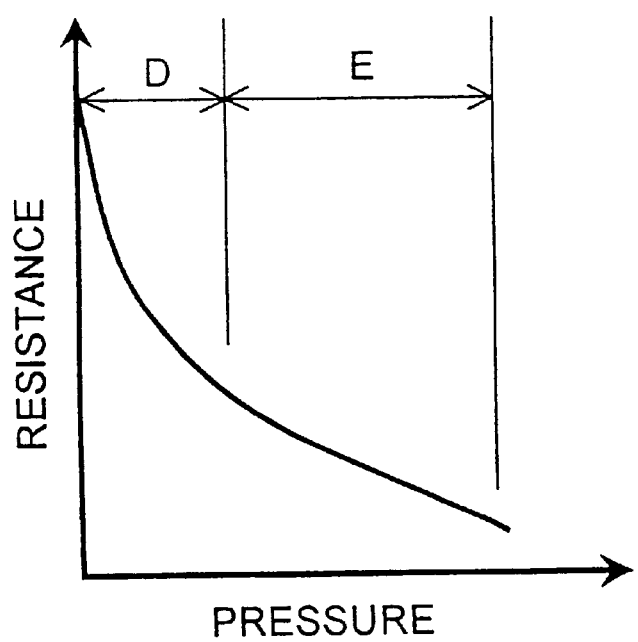
FIG. 7 is a graph showing a relationship between an electric resistance of a contact member and a load pressure acting thereon according to the second embodiment of the present invention.

FIG. 7 is a graph showing a relationship between an electric resistance of the contact member 50 and the terminal 38 and the load pressure, according to a contact detection device of the second embodiment.

Where the steering wheel is not or is slightly operated, the contact member 50 is a slight contact state with the terminal 38. In such a state, sensitive area can be obtained due to the increase of the mechanical strain in the contact member 50 and of contact area between the terminal 38 and the contact member 50 as the load pressure of the hydraulic pump increases, as shown the area D in FIG. 7.

Further, in the case of the stationary steering operation (i.e., the load pressure of the hydraulic pump changes form middle to large), the deformation of the contact member 50 is saturated, so that the area E proportional to the load pressure can be obtained due to the mechanical strain of the contact member 50.

According to the above-described construction, in case that surge pressure occurs in the hydraulic pump while the steering wheel is not operated, it is prevented the contact member 50 and the terminal 38 from coming into collision. Therefore, a stable electric characteristic can be obtained for a long time. In this state, the initial load acting between the contact member 50 and the terminal 38 is slightly small, so that the mechanical strain of the contact member 50 is also slightly small, whereby the electric resistance value is exceedingly large. Therefore, the leakage current can be diminished, resulting in eliminating the energy consumption of the vehicle.

Besides, in the first and second embodiments, the contact member is provided on the disk spring 35, but it may be provided on the terminal 38.

Furthermore, an example is presented such that the pressure detection device according to the first and second embodiments of the present invention is adopted to the power steering apparatus used in the automobile or the like, and however it can be also adopted to the other hydraulic apparatus.

A third embodiment according to the present invention will be now explained with reference to FIGS. 9–12.

First, the feature of the third embodiment is to provide a notch on the contact member 50 to improve linearity of an output signal thereof, and to provide a thermistor 60 for a temperature compensation in the contact member 50.

Generally, the third embodiment of the present invention is different from the second embodiment thereof in that a thermistor 60 is provided in a pressure detection device 20 and in a form of the contact member 50 attached to the terminal 38. The other portions of the third embodiment are the same as the first embodiment, and therefore the same portion is referred with the same reference number, and the detail of the same portion is omitted.

Figure 8:
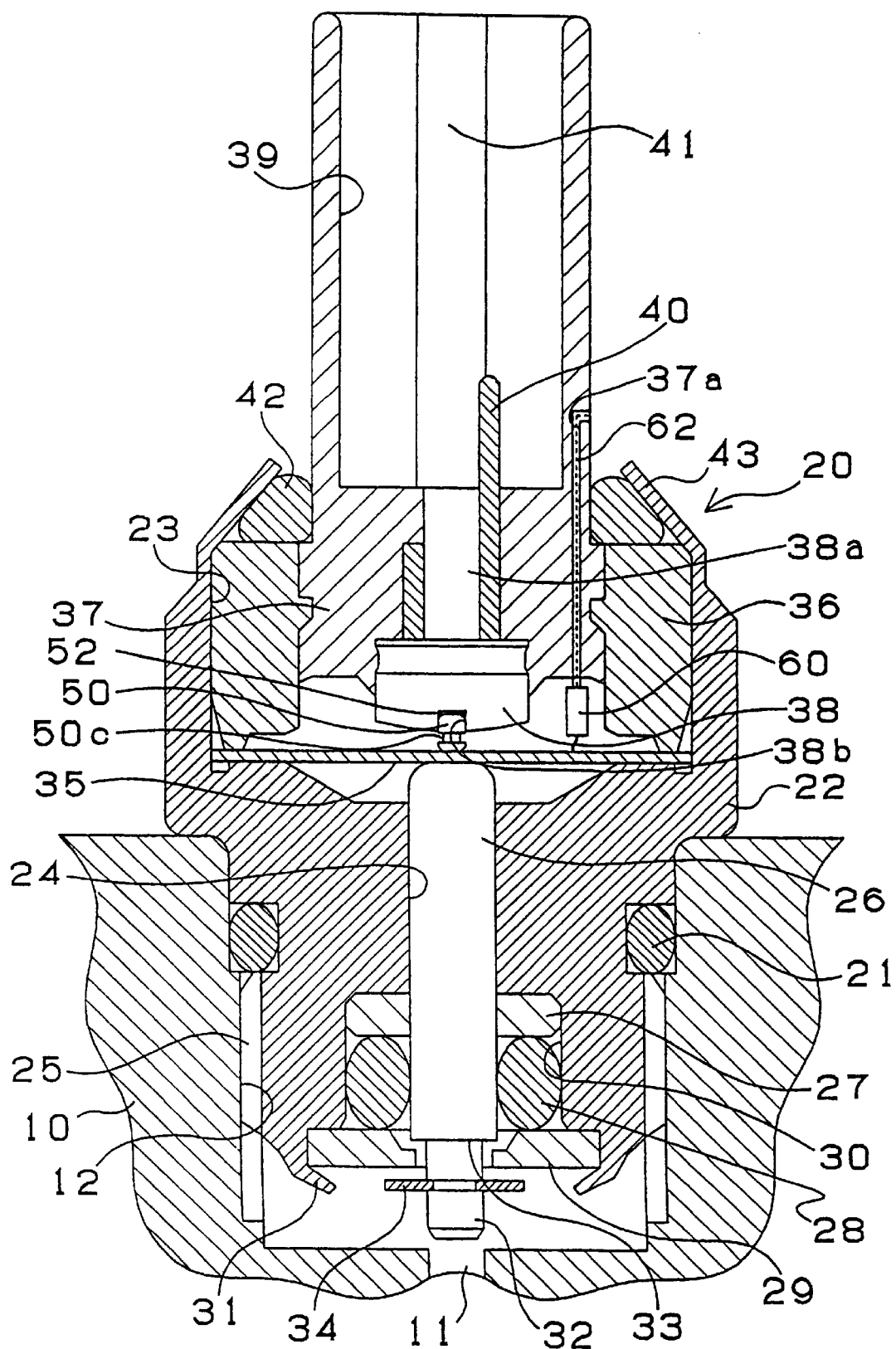
FIG. 8 is a sectional view showing a contact detection device according to a third embodiment of the present invention.
Figure 9:
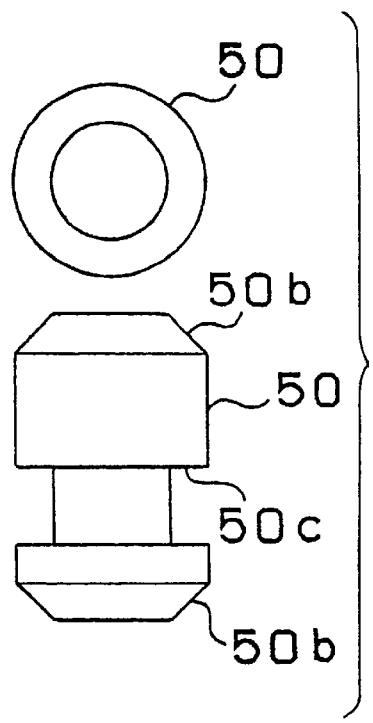
Figure 9:
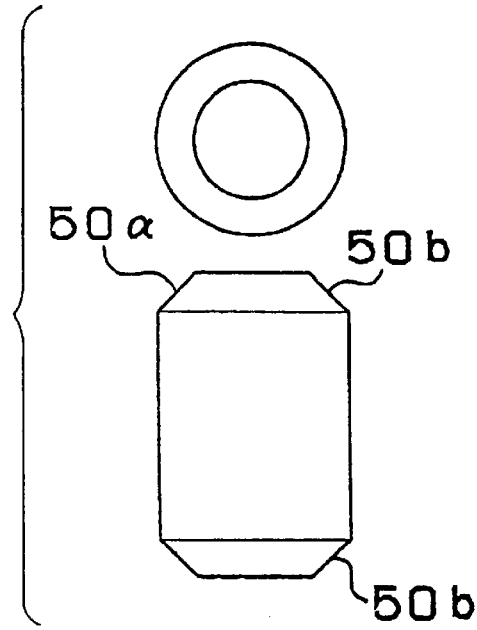
Figure 9:
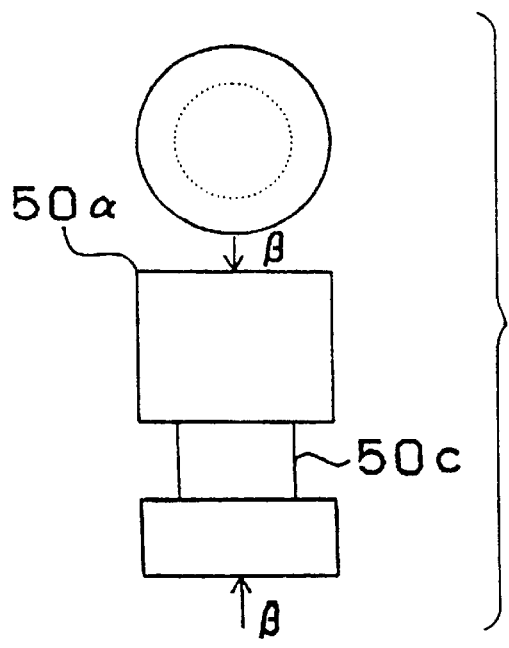
Figure 9:
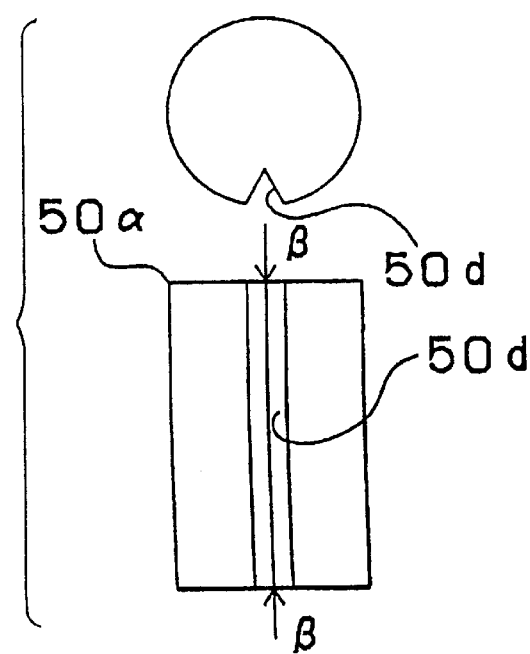

In the attachment of the thermistor 60 to the pressure detection device 20, the thermistor for detecting the temperature of the contact member 50 for compensation is provided in the support 37 made of resin serving as an insulating material, in which a signal line 62 of the thermistor 60 is connected to an illustrated compensation device through a pore 37a formed in the support 37, as shown in FIG. 8. Further, the contact member 50 is provided in a depression 38b formed in the terminal 38, into which the contact member 50 is joined by a solder 52 or the like.

The contact member 50 having a notch attached into the depression 38b will be now explained with reference to FIGS. 9(A)–9(H). FIG. 9(A) shows a top plan view and a front view of the contact member 50 having a notch. In a top end and bottom end surfaces of the contact member 50 is formed chamfers 50b, and also an annular groove 50c is formed in a middle portion thereof. Since the chamfers 50b and the annular groove 50c are formed on the contact member 50, the mechanical strain is concentrated thereto because of diminishing of sectional area. In the chamfers 50b and the annular groove 50c, the mechanical strain due to the external force is large compared with the other portion, so that the electric resistance characteristic to the load pressure is changed, whereby it can be obtained to improve the linearity in the electric resistance characteristic to the load pressure as a whole of the contact member 50.

FIG. 9(B) shows the contact member 50α in which the chamfers 50b are only formed, and also the annular groove 50c is only formed in FIG. 9(C). In FIG. 9(D), a vertical groove 50d is formed. In FIGS. 9(C) and 9(D), β represents a direction of the external force. Further, a notch 50e is formed in FIG. 9(E), and a hole 50f is formed by a drill in FIG. 9(F). Furthermore, a penetration hole 50g is formed in FIG. 9(G). In FIG. 9(H), the contact member 50 takes in the form of cylinder basically, and the penetration hole 50g and the vertical groove 50d are further formed.

The notch of the contact member 50 is formed when the above-described sensing material (ceramic) is burned, and also it is possible to form it after burning. Further, it is possible to partially form a portion of the notch and to form the remaining thereof after burning. This embodiment represents to form the chamfers 50b and the annular groove 50c on the contact member 50, and however it is possible to use a combination of various notches. Further, this embodiment represents to compensate electric resistance of the contact member 50 by using various notches, but it is possible to compensate it by changing specific resistivity or gauging rate.

Here, a circuit diagram used for detecting a terminal voltage of the pressure detection device 20 will be now explained with reference to FIG. 10.

In FIG, 10, a terminal resistance of the contact member 50 is represented as $R_S$. One of terminals of the contact member 50 ($R_S$) is serially connected to a power supply supplying 5V through a regulation resistance $R_T$, while the other terminal thereof is grounded. As mentioned above, a value of the resistance $R_S$ of the contact member 50 changes corresponding to the pressing force acting the contact member 50, so that an output voltage that divides the power supply voltage 5V by the regulation resistance $R_T$ is generated as a pressure output signal corresponding to the value of the resistance $R_S$. Similarly, one of terminals of the thermistor 60 is serially connected to the power supply through a regulation resistance $R_O$, while the other terminal thereof is grounded. The thermistor 60 changes its resistance value corresponding to an ambient temperature (i.e., the temperature of the contact member 50), so that the other output voltage that divides the power supply voltage 5V by the regulation resistance $R_O$ is generated as a temperature compensation signal corresponding to the value of the resistance of the thermistor 50. The pressure output signal and the temperature compensation signal are output to an unillustrated engine control unit (referred to as "EGC" hereinafter) after being converted from analog signal to digital signal (A/D convert).

The operation of the pressure detection device according to the third embodiment of the present invention will be explained hereinafter. Basically, the operation in the third embodiment is similar to that in the second embodiment. However, it differs from the operation in the second embodiment in that the thermistor 60 (ambient temperature detection element) is provided in the pressure detection device 20.

In a case that the steering wheel is not operated, the load pressure does not raise, so that the disk spring 35 is not deformed. In such a state, the external force does not act on the contact member 50, so that high resistance value is maintained, whereby the high voltage is output to the EGC as the pressure output signal. As a result, the EGC keeps the engine rotational speed at a predetermined level corresponding to the pressure output signal. On the other hand, in case that the steering wheel is operated at a small rotational degree when the engine is running at the idle rotational speed, the load pressure led from the pressure introduction passage 11 acts on the one end of the piston 26 with increasing of the load pressure of the hydraulic pump, resulting in deforming the disk spring 35. With this deformation of the disk spring 35, the external force acts on the contact member 50, so that the electric resistance value in the contact member 50 is decreased according to the impressed external force (the load pressure of the hydraulic pump). The terminal voltage of the contact member 50 corresponding to the electric resistance value thereof is output to the EGC as a pressure output signal. At the same time, the temperature compensation signal (the temperature of the contact member 50) from the thermistor 60 is also output to the EGC.

The value of the pressure output signal is compensated in the EGC by the temperature compensation signal, the engine is continuously controlled so as to perform the idle rotational speed in correspondence with the load pressure of the hydraulic pump. Namely, the idle rotational speed of the engine is adapted according the load pressure of the hydraulic pump, so that fuel consumption can be optimized. Particularly, since the pressure output signal is compensated by the ambient temperature, the idle rotational speed can be accurately controlled.

The third embodiment of the present invention is explained in the embodiment, however it can be applied to the first embodiment with the same effect.

Obviously, numerous modifications and variations of the present invention are possible in light of the above teachings. It is therefore to be understood that within the scope of the appended claims, the present invention may be practiced otherwise than as specifically described herein.

What is claimed is:

1. A pressure detection device for detecting an increase of pressure acting thereon, comprising:
   an electrically conductive device housing having an accommodation bore extending inward from one end of said device housing and a slide bore extending between said accommodation bore and the other end of said device housing;
   a piston slidably disposed within said slide bore and adopted to receive a pressure;
   a terminal serving as one electric contact and fixed to said accommodation bore via an electrical insulator;
   a disk spring positioned in said accommodation bore and in electrically conductive communication with said device housing serving as the other electric contact and disposed between said piston and said terminal; and
   an electro-functional member attached to either said terminal or said disk spring, said electro-functional member being changeable its electric resistance due to an impressed pressing force acting thereon.

2. A pressure detection device according to claim 1, said device further comprising:
   an annular elastic ring placed on one end of said insulator such that the annular elastic ring is located at an opening portion of said accommodation bore, said annular elastic ring being deformed by engagement with an inwardly bent end portion of said device housing, whereby the opening portion of said accommodation bore is sealed.

3. A pressure detection device according to claim 2, wherein said annular elastic ring is made of rubber and has a circular cross section.

4. A pressure detection device according to claim 1, wherein said electro-functional member is made of ceramic.

5. A pressure detection device according to claim 4, wherein said electro-functional member becomes to be low in its electric resistance as the impressed pressing force acting thereon is large.

6. A pressure detection device according to claim 1, said device further comprising:
   an ambient temperature detection element provided in said pressure detection device for temperature compensation.

7. A pressure detection device according to claim 6, wherein said ambient temperature detection element is a thermistor and is attached to said disk spring.

8. A pressure detection device according to claim 1, wherein at least one of a notch and a chamfer is formed in said electro-functional member for changing its electric resistance characteristic.

9. A pressure detection device according to claim 1, wherein said electro-functional member is attached to said disk spring and is faced with said terminal via a certain clearance, and said disk spring deforms due to a pressing force of said piston and comes in contact with said terminal.

10. A pressure detection device according to claim 1, wherein said terminal contacts said disk spring via said electro-functional member even when the impressed pressing force does not act on said piston.

11. A pressure detection device according to claim 10, wherein said electro-functional member is disposed in a depression formed in said terminal and contacts said disk spring.

* * * * *